United States Patent
Chandra et al.

(10) Patent No.: US 7,219,279 B2
(45) Date of Patent: May 15, 2007

(54) SOFTWARE TESTING

(75) Inventors: Satish Chandra, New Delhi (IN);
Bikram Sengupta, New Delhi (IN);
Vibha S Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/037,597

(22) Filed: Jan. 18, 2005

(65) Prior Publication Data

US 2006/0161833 A1    Jul. 20, 2006

(51) Int. Cl.
*G01R 31/28* (2006.01)
*G06F 9/00* (2006.01)

(52) U.S. Cl. .................. 714/724; 712/234
(58) Field of Classification Search ............ None
See application file for complete search history.

(56) References Cited

U.S. PATENT DOCUMENTS

| | | | |
|---|---|---|---|
| 5,555,418 A | 9/1996 | Nilsson et al. | |
| 6,446,137 B1 | 9/2002 | Vasudevan et al. | |
| 6,505,342 B1 * | 1/2003 | Hartmann et al. | 717/104 |
| 2003/0056200 A1 * | 3/2003 | Li et al. | 717/128 |
| 2004/0083462 A1 | 4/2004 | Gschwind et al. | |
| 2006/0085156 A1 * | 4/2006 | Kolawa et al. | 702/119 |

FOREIGN PATENT DOCUMENTS

JP    6131215    5/1994

* cited by examiner

*Primary Examiner*—Christine T. Tu
(74) *Attorney, Agent, or Firm*—Gibb I.P. Law Firm, LLC; T. Rao Coca, Esq.

(57) ABSTRACT

A system and method for generating executable units suitable for unit testing of a module for integration errors, the method comprising; recording, for a module, an interface specification that specifies pre-condition constraints on input values of methods of the module and post-condition constraints on output values of the methods of the module; creating, based upon the recorded interface specification, a driver unit for the module that complies with the pre-condition constraints specified by the interface specification; and creating, based upon the recorded interface specification, a stub unit for the module that checks compliance with the specified pre-condition constraints and that complies with the specified post-condition constraints of the interface specification.

24 Claims, 5 Drawing Sheets

SOFTWARE TESTING

FIELD OF THE INVENTION

The present invention relates to software testing and relates more particularly to the use of stubs and drivers in testing software modules that are developed during software projects.

BACKGROUND

Software testing may involve coding drivers and stubs, which represents a particular development overhead as these pieces of software code are developed for unit testing of individual modules, but are subsequently discarded during module integration. However, testing of individual modules cannot be postponed until the integration testing phase. Software bugs detected during integration may necessitate several days of development effort to be undone, thus causing considerable "re-work" and, consequently, escalated project costs, and delayed delivery.

A different approach recommended by some practitioners is to follow "bottom-up" development. That is, a module M is developed before developing the modules that invoke M. This approach does eliminate the need for stubs, but following such a scheme is often not practical in large projects. On one hand, spreading the development of different module layers (often representing distinct functionalities) across different development teams, working simultaneously, is often cost-effective. On the other, since development proceeds upwards in a bottom-up approach, even a prototype of the complete application does not exist until the last module is added. This is not a situation most development teams find satisfactory.

A further approach, and the one commonly followed in practice is to create "rudimentary" drivers and stubs that have a minimum of structure and function. For example, a driver for a module M is often just a "main" program that passes particular data to M and prints relevant results. A stub is typically a dummy sub-program that may do some minimal data manipulation (for example, some input parameter to output value mapping), print verification of entry, and return. Tools may be used to generate mapping tables and wrapper code for stubs and drivers to assist in this process.

As an example, consider a program that generates a stub based on the syntactic interface of the corresponding module. The developer completes a table/vector with input values and expected return values. The stub code, when invoked, searches through the table/vector to match input parameters to records in the table and extracts the corresponding return value. Table 1 below provides an example table that may be developed from such a program. In this example, a class "calc" has a function called "divide".

TABLE 1

| int divide( int numerator, int denominator) throws Exception | | | | |
|---|---|---|---|---|
| Calc | | | | |
| Divide | | | | |
| | Numerator | double | {20} | 20 |
| | Denominator | double | {4} | 0 |
| | divide_ret | double | {5} | |
| | Exception | Throwable | | dividebyZero |

Similarly, driver generation tools provide the syntactic wrapper code to test a function. The developer needs to write the code to set the state of the object and then invoke the function under test with correct parameters.

Table 2 below presents an example of a driver generated for testing the same function ("divide") described with reference to Table 1 above, in which the code written by the developer is underlined.

TABLE 2

```
Calc c = null;
void setup( ) {
    //user needs to set state of object - this function
    //is automatically invoked before testDivide called
    c = new Calc( ); }
int testDivide(int numerator, int denominator) {
    //user needs to fill in code to invoke function - e.g.
    int i = 10; int j = 2;
    System.out.println(c.divide(i,j)); }
```

The approaches briefly described above reduce the development overhead associated with producing stubs and drivers, but the resulting unit testing often remains far from comprehensive.

There is thus a need for an improved method of unit testing of software modules that seeks to bridge the gulf between unit and integration testing.

SUMMARY

Unit testing of individual software modules is a first step towards producing a reliable software system. Most modules, however, are not stand-alone programs that execute in isolation. Rather, one may conceive modules as arranged in tiers, where a module in a middle tier is invoked by one or more modules above, and may in turn call other modules below. Thus, to unit test a module M, driver and stub units can be created to form a "closed system". Drivers are generated to simulate the behavior of modules calling M and stubs are generated to simulate the behavior of modules that are called by M. During subsequent integration, these units are replaced by the "real" (callee and called) modules that form the software system.

Simple table-lookup-based stubs, as presented in Table 1 of the background section above, do not support the testing of inter-module intricacies such as constraints on parameters, and correct method invocation order, both of which are common sources of integration errors. Also, drivers of the type exemplified in Table 2 above are directed towards single methods in a class, rather than sequences of methods that should be exercised for effective testing. As a consequence, serious defects relating to how modules interact may remain hidden during the unit testing of modules using such simple stubs/drivers, and become evident only when these modules are integrated. Defects discovered during integration testing can be significantly more expensive to rectify to compared to detecting and rectifying such defects during unit testing.

An interface specification captures the constraints on module M, using a formal notation. The constraints are specified as what are termed pre-conditions, relating to constraints on the modules that call M, and post-conditions, relating to constraints on the values returned by M to the calling module. The pre-conditions are constraints on the input parameters passed to the methods of M, while post-conditions are constraints on the output values generated by the methods of M. The interface specification may be supplemented by additional constraints. For example, further pre-conditions may constrain the order in which the methods of M are invoked. "Smart" stub units and driver units are generated from the interface specification. The generation of stub and driver code can be automated using a suitable tool so that developer overhead is reduced.

For comprehensive unit testing, stub and driver units are considered in the techniques described herein as "pre-integration" artifacts (as opposed to dummy ones): a "smart" driver for a module M can invoke M in many different but correct ways, while a "smart" stub for M can catch invocation errors originating from a client module's code. Smart stubs and drivers can thus cause aspects of integration testing to be in effect during unit testing, and thereby improve subsequent integration testing.

Existing dummy stubs/drivers of the type described in the background section above have minimal useful functionality and, as a result, unit testing is often not comprehensive, and errors are detected during integration. For example, during integration testing, a client may invoke a valid method sequence on a module M, which is untested during unit testing of M, but which causes an error in M to be detected.

The "smart" drivers described herein can by contrast reduce this possibility by automatically generating all possible valid method sequences that a calling module may invoke on M, thereby also lessening the developer's burden of having to manually create these sequences. Again, during integration testing, a calling module may invoke a method in M incorrectly (for example, invoke an invalid method sequence, or pass incorrect parameters to a method in a sequence), although this is not detected during the unit testing of the client that used a dummy stub for M. The "smart" stubs can, however, check at unit testing if the calling module is correctly invoking M, thereby assisting subsequent integration testing.

An existing modeling notation Java Modeling Language (JML) is used to specify constraints on input parameters and output values. The modeling notation is further enhanced to describe constraints on the method invocation order of a class. Any language based on the Design-by-Contract paradigm (for example, JML, OCL, Eiffel, and so on) can, in principle, be extended to achieve this objective. Such languages allow pre-conditions and post-conditions on class methods to be specified.

DETAILED DESCRIPTION

Figure 1A:
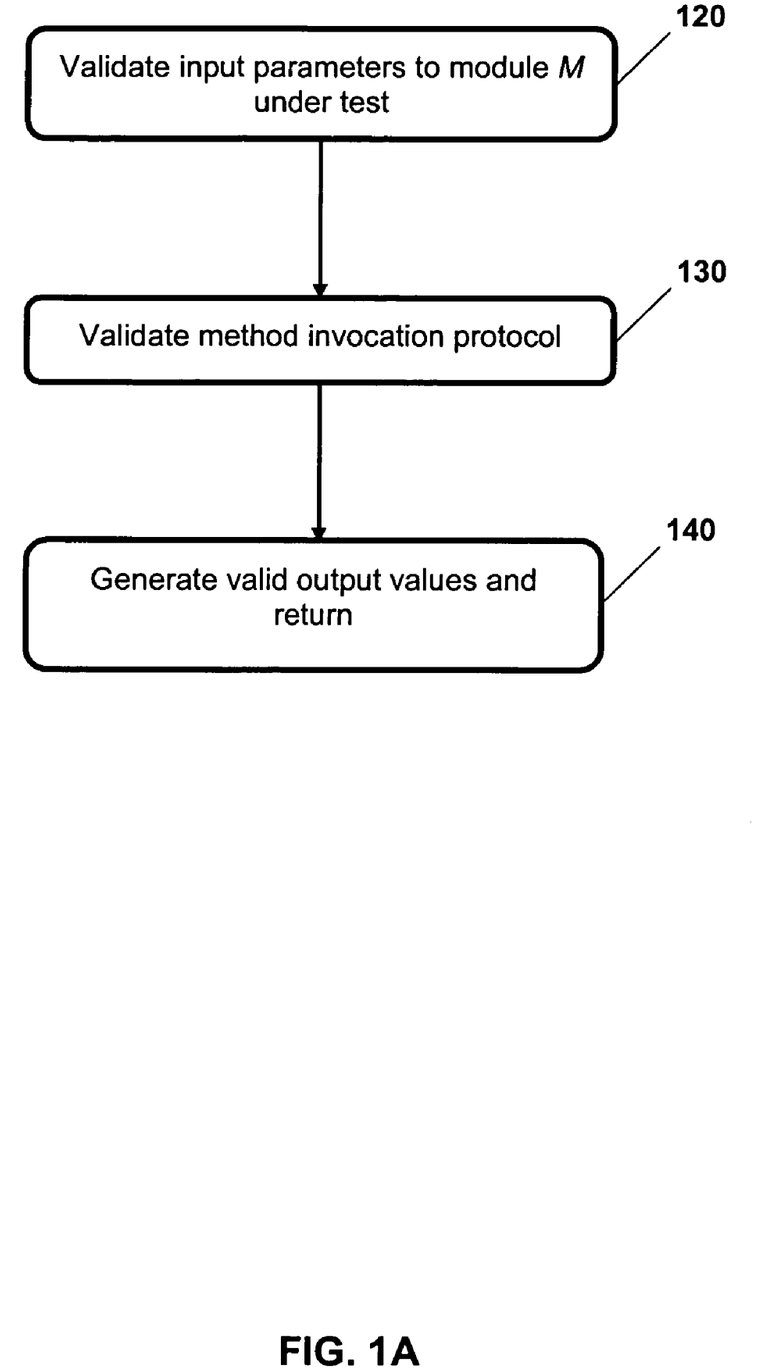
FIGS. 1A and 1B are flow charts that summarize functionality expected of stubs and drivers when they are used as pre-integration artifacts in the techniques described herein.
Figure 1B:
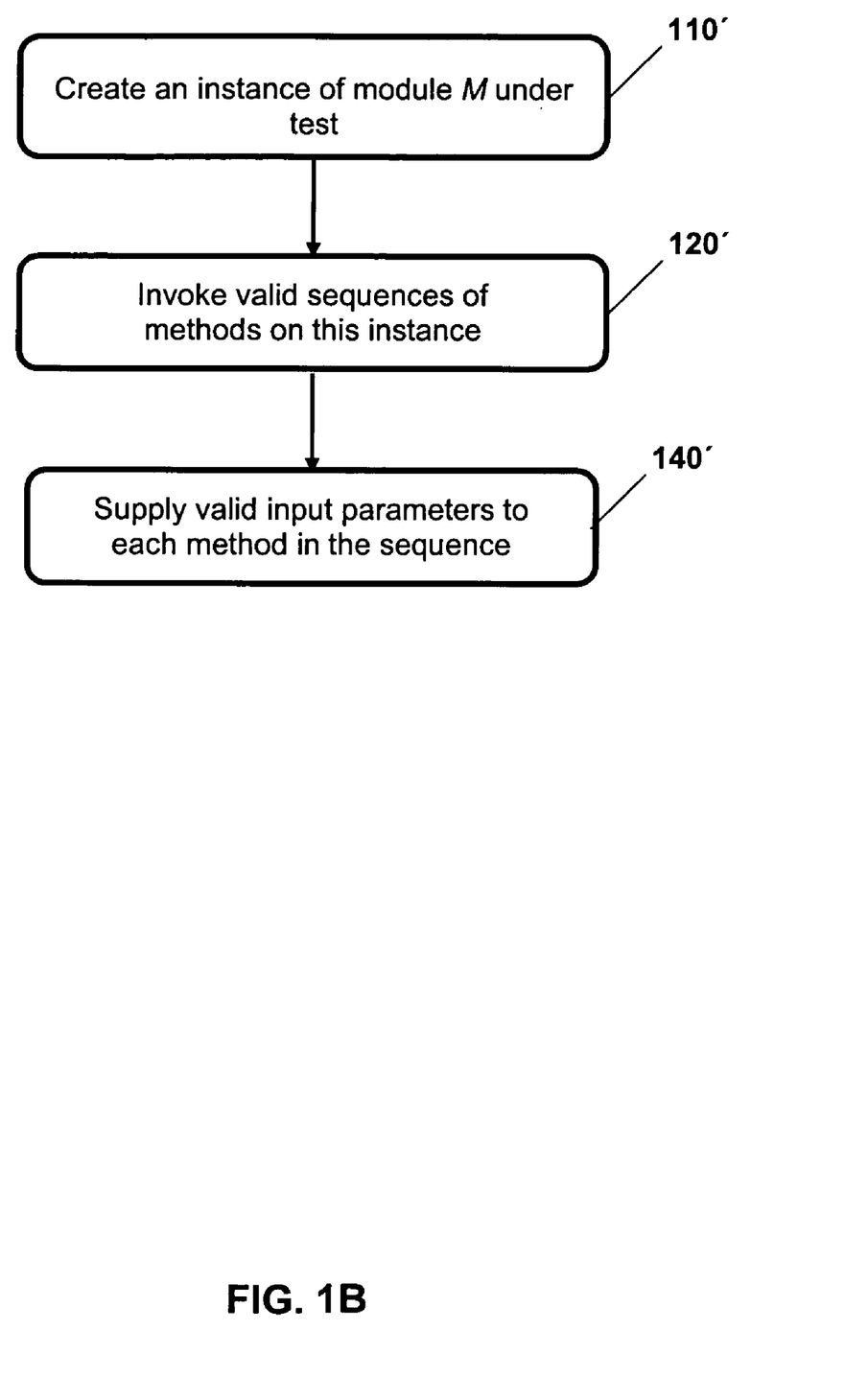

FIGS. 1A and 1B summarize functionality expected of stubs and drivers when they are used as pre-integration artifacts. Testing is described with reference to a software module M, which is synonymous with the classes for which stubs and drivers are generated in the described examples.

FIG. 1A outlines the steps involved in the functioning of a stub when invoked by a calling module. First, input parameters (there may be constraints on what values the input parameters of the method may take) are validated in step 120. The method invocation protocol (for example, the method might require being called only after certain other methods of the module are invoked) is validated in step 130. "Valid" output values are generated and returned to the calling code in step 140. The values need not be correct as per input parameters passed, but should satisfy any applicable constraints on the method's output.

FIG. 1B flow charts steps involved in the functioning of a driver that calls methods of a module under test. An instance of the module under test is created in step 110'. Valid sequences of method calls on this object are invoked in step 120'. "Valid" input parameters are supplied to each method in the sequence in step 140'. The values should satisfy any applicable constraints on a method's parameters.

The reason "valid" input parameters are created for drivers, and output values are created for stubs, is to automate the generation of complete stub and driver units as far as practicable. During unit testing, developers may not be concerned about the exact values being returned from a stub, or the precise parameters passed from a driver, as long as the values or parameters are possible values that can be handled by the class-under-test. The developer's task is made easier if such test values can be automatically generated. Of course, the developer can complement this by manually creating values that are of particular interest/importance.

The other features of a smart stub (validating input parameters and method invocation orders, two common sources of integration errors) are specifically directed towards performing a "pre-integration" at the time of unit testing. For smart drivers, the automatic generation of many different but legal sequences of method calls is meant to provide better "coverage" of the various ways in which the module may be used post-integration. Thus "smart" stubs and drivers provide not only a dummy infrastructure for unit testing, but also bring aspects of integration to bear on in the early stages of development when individual modules are being developed, thereby assisting subsequent assembly of modules.

To automatically generate a smart stub and driver for a module M, one formally specifies the constraints on input parameters and method invocation orders in M's public interface.

Modeling languages such as JML include ways of specifying pre-conditions on a method, and these pre-conditions are commonly used to describe constraints on its input parameters. This capability can be extended to handle pre-conditions that arise because of constraints on when a method may be invoked: in many modules, a method m can be legally called only if prior calls have been made to other methods of that module.

Post-condition features of modeling languages may be used to specify constraints on the output values of a method. The encoded specifications can be then used to generate executable stub/driver code for use in unit testing, as described below in further detail.

As regards the practicality of this approach, developers generally develop the interfaces of different modules during an initial design phase. Typically, such interfaces are only syntactic in nature, and all relevant semantic information is stored as informal documentation. Developers of client-classes may have difficulty in using this knowledge (that is, by some automated means) when developing or unit testing the calling modules.

The same information, however, can also be written formally using interface specification languages such as JML, which can then be used to generate "smart" stubs and drivers automatically. The extra effort that is required to write semantic specifications in the design phase is anticipated in most practical cases to be offset by the benefits obtained through the automatic generation of smart stubs and drivers that can detect integration errors during unit testing.

Pre-conditions and post-conditions, presented as lists of Boolean expressions, are used in the techniques described herein. The pre-condition of a method expresses requirements that any call to the method must satisfy if the call is to be considered correct, while its post-condition expresses properties that should be true after the execution of the call, provided that the pre-condition is satisfied.

If a method (annotated with pre-conditions and post-conditions) is invoked such that its pre-condition is true, then the post-condition hold true on method execution; otherwise, there is a bug in the implementation. Further, if the pre-condition of a method in a module N is violated when module M invokes N, then it indicates a bug in M.

JML syntax is described in the example used herein, for the sake of convenience: other similar languages can also be used. Pre-conditions are expressed in JML using a

TABLE 4

S: LHS "->" RHS
LHS: (Term "," )* Term
Term: ["!"] "(" Compound_name ")" ["*", 0–9]
 | Method_name
Compound_name: (Method_name "|" )* Method_name | "."
RHS: Method_name [+]
Method_name: [A–Z, a–z, _ ] [A–Z, a–z, _, 0–9]*

Informally, the method listed in the RHS can only occur if the LHS is satisfied. That is, the methods that occur freely in the LHS are executed the specified number of times in proper sequence, and the methods guarded by "!" are not called. A term 1→r is implicitly treated in the grammar of Table 4 above as a Boolean expression that is true when the sequence 1 is satisfied. Such a constraint may be specified as a JML-like pre-condition, using requires 1→m or requires 1→m+, as appropriate. Table 5 below presents some example protocols based on this grammar.

TABLE 5

Any call to method A should be immediately preceded by call to method B is represented as:
//@ requires B -> A
Before calling method A, method B should have been called sometime before on the object is represented as:
//@ requires B, (.)* -> A+
Before calling method A, method B should have been called, followed by any other method except C is represented as:
//@ requires B, !(C)* -> A+
Any call to method A should be immediately preceded by two calls to method B is represented as:
//@ requires (B)2 -> A
As regards notation, the following apply:
    "." - any method can be invoked
    "*" - 0 or more occurrences
    "+" - one or more occurrences
    "!" - excluding what follows "requires" clause, and post-conditions are expressed through an "ensures" clause. An extract from an example JML specification is presented below, where some pre-conditions and post-conditions on the method "Person" are specified in Table 3 below.

TABLE 3

Public class Person {
private String name;
private int weight;
/* @ public behavior
@ requires n != null && !n.equals(" ");
@ ensures n.equals(name) && weight = = 0;
@*/
public Person(String n) {name = n; weight = 0; }
.....
}

Method Invocation Protocol

The "requires" clause is useful for specifying constraints on the input parameters of a method. There is, however, no easy way to describe when a method m may be invoked, that is, whether there certain other methods in the class that should or should not be called before m. Such protocols, if not explicitly specified initially, often lead to later integration problems. Table 4 below presents a grammar for these protocols.

Method names are used in the examples presented in Table 5 above, though in practice a method name is used in conjunction with its type signature, to distinguish overloaded methods. Also, the grammar defined in Table 4 above is only one possible way in which method invocation orders may be specified. The techniques described herein can be adapted as required to suit the particular manner in which method invocation order is specified.

Generating Smart Stubs

Figure 2A:
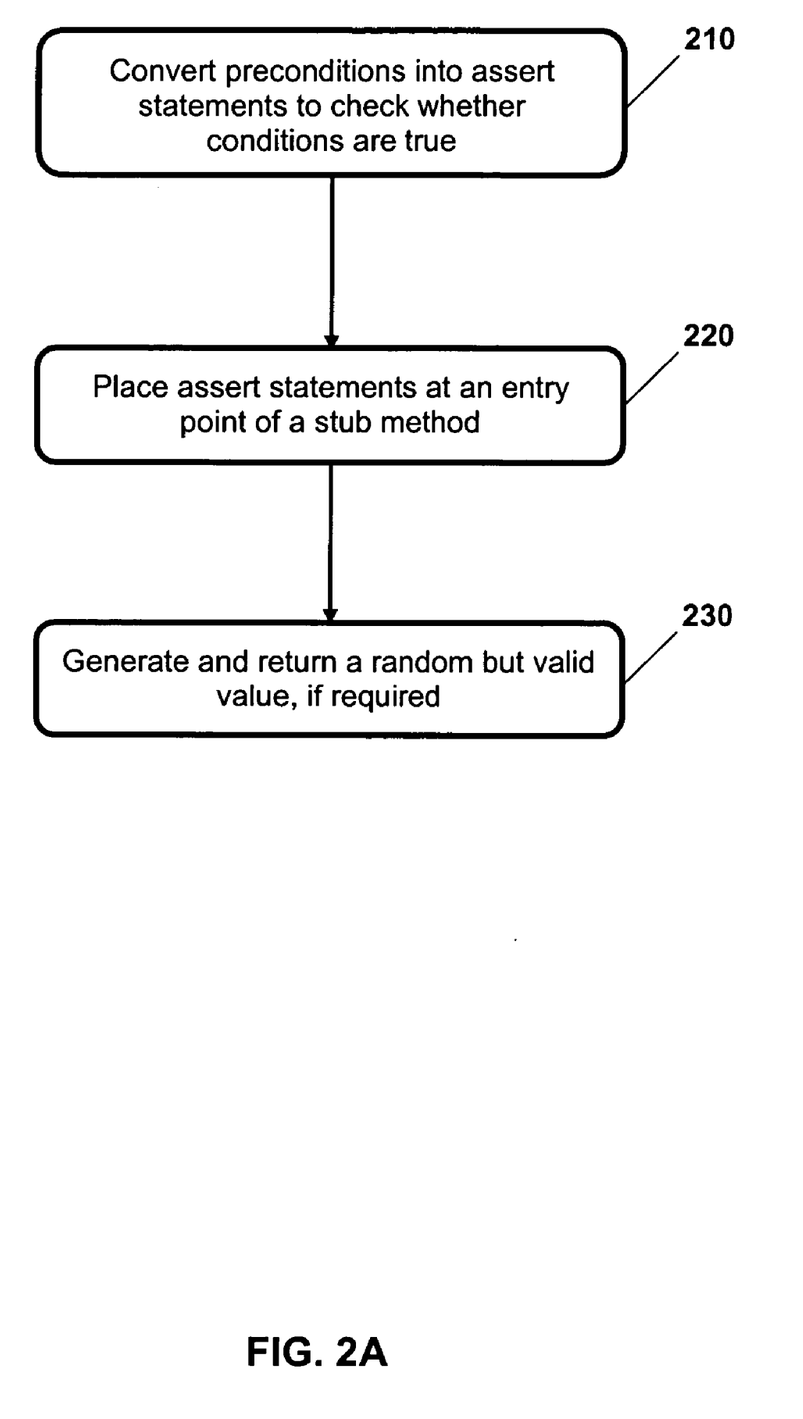
FIGS. 2A and 2B are flow charts presenting steps involved in generating code for stubs and drivers as described herein.

FIG. 2A flow charts the steps involved for each method in a class when generating a stub. The input to this procedure is a class interface specification where each method is optionally annotated with pre-conditions (namely, in this case, constraints on input parameters, and method invocation order) and post-conditions (namely, in this case, constraints on return values).

Pre-conditions are converted into assert statements in step 210, to check if the corresponding Boolean expression is true. For pre-conditions on input parameters, Boolean expressions are directly available (for example, n!=null). For pre-conditions (for example, 1→r) on method invocation protocols, a Boolean function is created that returns true if 1 is satisfied. To achieve this, the function has to maintain a history of methods invoked on the object. This suggests that a common Boolean function (for all the methods) parameterized by the method name is appropriate. Each time a method is called, the function returns true if the invocation order for that method is satisfied and updates the invocation history; otherwise, the function returns false.

The assert statements are placed at the entry point of the stub method in step 220. If the method is supposed to return some value, then a random value of the correct type is generated that satisfies relevant post-conditions in step 230. This value is returned to the caller to complete the stub routine.

Generating Smart Drivers

Figure 2B:
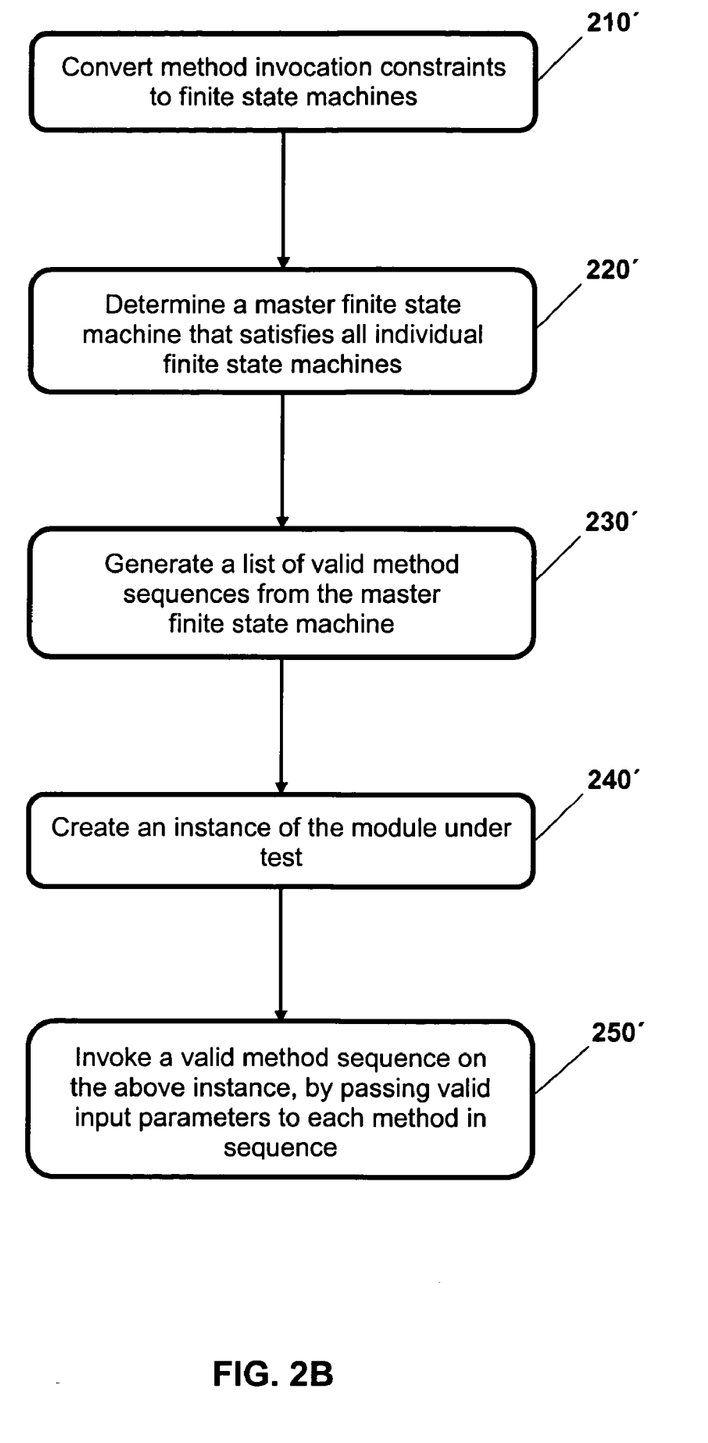

FIG. 2B flow charts steps involved in generating a driver. The input is a class interface specification where each method is optionally annotated with pre-conditions (on input parameters and method invocation order) and post-conditions (on return values).

Each method invocation constraint of the form 1→r is converted to a finite state machine (FSM) in step 210', such that the language of the state machine is the set of method sequences that satisfy this constraint. Since 1 is similar to a regular expression over an alphabet of method names, this translation is straightforward, except as regards how to handle "!". If S={a,b,c,d} is the set of all method names, then "!(a|b)" is treated as equivalent to "c|d".

The intersection of all the finite state machines generated in step 210' is determined in step 220'. This yields a new finite state machine whose execution sequences respect all the method invocation protocols of the various methods. In other words, this machine represents all possible legal method sequences that a client may invoke. Thus, in effect, an integrated constraint is composed from each of the constraints relating to invocation order.

The resulting finite state machine may be traversed (for example, using Breadth-First-Search) to generate a list of driver sequences of specified length in step 230'.

The user can select a sequence from the above list for which executable code needs to be generated. The generated class file first creates an object of the class under test (240'). The class file then invokes the methods specified in the driver sequence in the correct order and passes random input values to the driver in step 250'. These values have the correct type, and satisfy the pre-conditions on the method's input parameters.

The above algorithms described with reference to FIGS. 2A and 2B both generate pseudo-random data that satisfies certain constraints (pre-conditions on input parameters for drivers, and post-conditions on method return values in case of stubs). Existing techniques can be used to generate pseudo-random values within the constraints of the pre-conditions and post-conditions.

JMLC, a compiler for JML, can convert method pre-conditions into assertions. JMLC is used to translate constraints on input parameters to corresponding assert statements. JMLC, however, is not able to handle enhancements in the form of method invocation constructs. A pre-processor is thus constructed, which performs a number of functions. The pre-processor creates a global table T that stores the invocation protocols of the different methods as records in the table. The pre-processor also creates a Boolean function of the form: is Valid(<method-name>).

The function is Valid takes in a method name, for example m, and searches T to determine if the method invocation order for m has been satisfied. The pre-processor achieves this by maintaining a pointer with each invocation protocol to keep track of how much of the sequence 1, in a record 1→r (where r can be m or m+) has been traversed. If the end of 1 is reached, the execution of m is allowed, and the pointers of the different records are adjusted appropriately. Otherwise, the execution of m is prohibited.

If the method m is supposed to return some values, then the preprocessor also inserts code that generates random values of the correct type. Once the pre-processing step is over, the intermediate class file is handed over to JMLC, which completes the processing by inserting assert statements for the input parameter constraints.

The architecture of the prototype tool can be described as follows. An interface for class M includes constraints on input parameters, method invocation orders and output values, and is presented as a .java file to the pre-processor. The pre-processor creates a table to store method invocation orders of different methods. Also, an isValid function is created that keeps track of global invocation history and decides when a method invocation is valid. Random but valid return values are generated and returned. The modified java file then passes from the pre-processor to the JMLC, or JMC compiler, which converts the input parameter constraints to assertion checks. A resulting class file is generated as a stub class for M.

For generating drivers, a method invocation order is passed as part of an interface for class M as a .java file to the processor. A FSM is created for each invocation order. The intersection of these FSMs is determined. A search is made for method sequences of a specified length. A selected method sequence passes to a driver generator, which creates an instance of the class under test, using a default constructor. For each method in the input sequence, a corresponding method call is created, and random but valid input arguments are generated. The driver class for M is thus produced.

EXAMPLES

Example stub and driver units that may be generated are presented in Tables 6 and 7 below.

TABLE 6

```
Input
public class X {
    public X(int a, int b){ ...... }
    //@ requires b,e -> a
    String a(){ .... }
    //@ requires c -> b
    int b(int i) { .... }
    //@ requires d -> c
    void c(String a) { .... }
    void d(Long 1) { .... }
    boolean e(){ .... }
}
Output
import stub.random.*;
public class X_Driver{
    static GenerateRandom random = new GenerateRandom();
    public static void main(String[ ] args)
    {
        int x_int_0 = RandomGenerator.getIntValue();
        int x_int_1 = RandomGenerator.getIntValue();
        X obj = new X (x_int_0,x_int_1);
        java.lang.Long x_Long_0 =
        RandomGenerator.getLongValue( );
        obj.d(x_Long_0);
        java.lang.String x_String_0 =
        RandomGenerator.getStringValue( );
        obj.c(x_String_0);
        int x_int_2 = RandomGenerator.getIntValue();
        int _tmp_2 = obj.b(x_int_2);
        boolean _tmp_3 = obj.e();
        java.lang.String _tmp_4 = obj.a(); }
}
```

The resulting driver sequences of depth 4 for method "a" is d, c, b, e, a. The output presented in Table 6 above implements this sequence.

TABLE 7

```
Input
Public class Person
{
    //@ requires weight > 0 &&
    (name != null && !name.equals(""));
    public Person(int weight, String name);
    //@ requires add > 0;
    public void addKgs(int add);
    int getWeight();
    String getName();
    // queries a backend database to get
    // information about a person's school
    School getSchool();
}
public class School
{
    public String name;
    public String city;
}
Output (as pseudocode due to space constraints)
Public class Person{
    public Person(int weight, String name) {
        //assert checks for pre conditions
        assert name != null && !name.equals("");
        assert weight > 0 }
    public void addKgs(int add) { assert add > 0; }
    int getWeight() { generate and return random int }
    String getName() { generate and return random string }
    School getSchool(){
        generate and return random valued object
        of type school }
}
public class School {
    public String name; public String city;
    School generateRandom()
    {
    function to generate random valued object of
    type school
    } }
```

The example of Table 7 above indicates that a stub is generated for a class "Person". A function "getSchool" in this class returns an object of type "School". A custom function is provided in class "School", which can generate the random instance.

The HttpURLConnection class from package java.net.* is used to connect to a Web URL through a Java program, and get/submit data to that URL. This class, however, does have some inherent method invocation protocols. A connection is established before getting or submitting data, that is, the connect function should be called before any information getting or setting functions. Further, if a connection is disconnected then a connection should be re-established again before any getting or setting functions called.

Using custom method invocation constructs above protocol can be specified as follows:

//@requires connect,!(disconnect)*->getResponseCode+

The "getResponseCode" determines the connection request status from the established connection. During stub generation, the above construct is converted into a JML requires clause and a validating function is instrumented. This validating function checks if the specified construct for invocation order is satisfied before the method is invoked.

Table 8 below presents psuedocode of the generated stub for concerned functions.

TABLE 8

```
//@ requires valid("connect");
// invocation_order Ø -> connect
public void connect( ){}
// invocation_order connect,(.)* -> disconnect+
//@ requires valid("disconnect");
public void disconnect( )
{// requires clause converted into assert statements by JMLC
}
// invocation_order connect,!(disconnect)* ->
getResponseCode+
//@ requires valid("getResponseCode");
public int getResponseCode( )
{
    // generate and return random int
}
/*
    Function to check method invocation order
    Called before every method invocation on this object
    irrespective of whether particular method has an
    invocation constraint or not
*/
public /*@ pure @*/ boolean valid(String methodName)
{
    // check if given methodName is invoked in correct order
    // based on regular expression given for each correctly
    // invoked method, add to method invocation history
}
```

Computer Hardware

Figure 3:
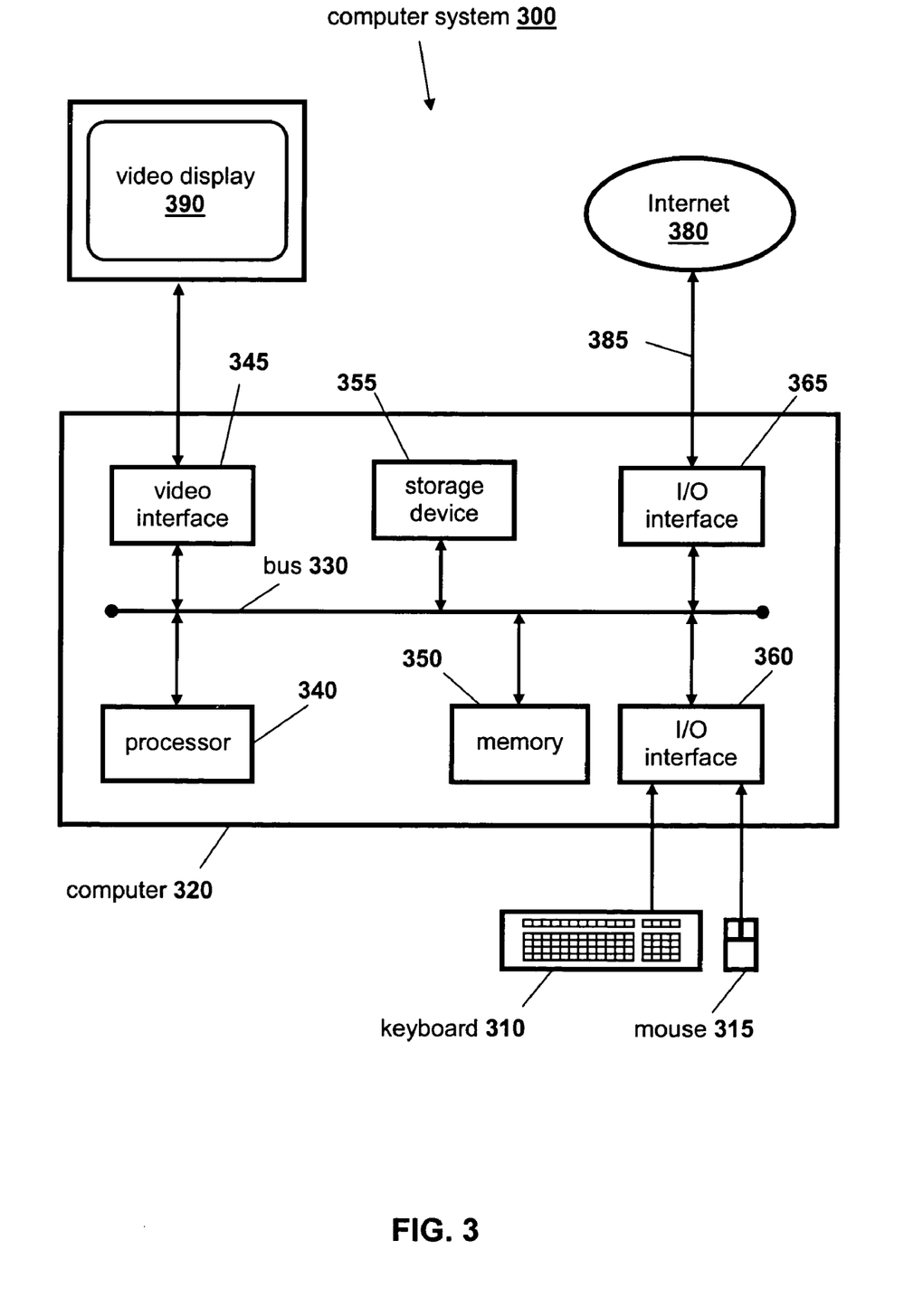
FIG. 3 is a schematic representation of a computer system suitable for performing the techniques described herein.

FIG. 3 is a schematic representation of a computer system 300 suitable for executing computer software programs for generating stubs and drivers as described herein. Computer software programs executes under a suitable operating system installed on the computer system 300, and may be thought of as a collection of software instructions for implementing particular steps.

The components of the computer system 300 include a computer 320, a keyboard 310 and mouse 315, and a video display 390. The computer 320 includes a processor 340, a memory 350, input/output (I/O) interfaces 360, 365, a video interface 345, and a storage device 355. All of these components are operatively coupled by a system bus 330 to allow particular components of the computer 320 to communicate with each other via the system bus 330.

The processor 340 is a central processing unit (CPU) that executes the operating system and the computer software program executing under the operating system. The memory 350 includes random access memory (RAM) and read-only memory (ROM), and is used under direction of the processor 1040.

The video interface 345 is connected to video display 390 and provides video signals for display on the video display 390. User input to operate the computer 320 is provided from the keyboard 310 and mouse 315. The storage device 355 can include a disk drive or any other suitable storage medium.

The computer system 300 can be connected to one or more other similar computers via a input/output (I/O) interface 365 using a communication channel 385 to a network, represented as the Internet 380.

The computer software program may be recorded on a storage medium, such as the storage device 355. Alternatively, the computer software can be accessed directly from the Internet 380 by the computer 320. In either case, a user can interact with the computer system 300 using the keyboard 310 and mouse 315 to operate the computer software program executing on the computer 320. During operation, the software instructions of the computer software program are loaded to the memory 350 for execution by the processor 340.

Other configurations or types of computer systems can be equally well used to execute computer software that assists in implementing the techniques described herein.

Conclusion

Various alterations and modifications can be made to the techniques and arrangements described herein, as would be apparent to one skilled in the relevant art.

We claim:

1. A method for generating executable units suitable for unit testing of a module for integration errors, said method comprising:

recording, for a module, an interface specification that specifies pre-condition constraints on input values of methods of the module and post-condition constraints on output values of the methods of the module;

creating, based upon the recorded interface specification, a driver unit for the module that complies with the pre-condition constraints specified by the interface specification; and creating, based upon the recorded interface specification, a stub unit for the module that checks compliance with the specified pre-condition constraints and that complies with the specified post-condition constraints of the interface specification.

2. The method as claimed in claim 1, further comprising incorporating, at an entry point of the stub unit, one or more statements that determine compliance with the specified pre-condition constraints.

3. The method as claimed in claim 2, further comprising incorporating, at an exit point of the stub unit, a statement that returns a value that complies with the specified post-condition constraints.

4. The method as claimed in claim 1, wherein the interface specification records pre-condition constraints that specify constraints on the invocation order of the methods of the module.

5. The method as claimed in claim 4, further comprising composing an integrated pre-condition constraint that incorporates each of the specified constraints on the invocation order of the methods of the module.

6. The method as claimed in claim 4, further comprising generating all method invocation sequences that comply with the specified pre-condition constraints upon the invocation order of the methods of the module.

7. The method as claimed in claim 6, further comprising calling the methods specified in each of the generated valid method invocation sequences with input parameters that comply with the specified pre-condition constraints on the input methods of the respective methods of the module.

8. The method as claimed in claim 1, wherein each of the pre-condition and post-condition constraints are specified using an extension of a language based on a design-by-contract paradigm.

9. A computer program product comprising:

a storage device readable by a computer system and recording software instructions executable by a computer system for implementing a method comprising:

recording, for a module, an interface specification that specifies pre-condition constraints on input values of methods of the module and post-condition constraints on output values of the methods of the module;

creating, based upon the recorded interface specification, a driver unit for the module that complies with the pre-condition constraints specified by the interface specification; and creating, based upon the recorded interface specifications, a stub unit for the module that checks compliance with the specified pre-condition constraints and that complies with the specified post-condition constraints of the interface specification.

10. The computer program product as claimed in claim 9, wherein said method further comprises incorporating, at an entry point of the stub unit, one or more statements that determine compliance with the specified pre-condition constraints.

11. The computer program product as claimed in claim 10, wherein said method further comprises incorporating, at an exit point of the stub unit, a statement that returns a value that complies with the specified post-condition constraints.

12. The computer program product as claimed in claim 9, wherein the interface specification records pre-condition constraints that specify constraints on the invocation order of the methods of the module.

13. The computer program product as claimed in claim 12, wherein said method further comprises composing an integrated pre-condition constraint that incorporates each of the specified constraints on the invocation order of the methods of the module.

14. The computer program product as claimed in claim 12, wherein said method further comprises generating all method invocation sequences that comply with the specified pre-condition constraints upon the invocation order of the methods of the module.

15. The computer program product as claimed in claim 14, wherein said method further comprises calling the methods specified in each of the generated valid method invocation sequences with input parameters that comply with the specified pre-condition constraints on the input methods of the respective methods of the module.

16. The computer program product as claimed in claim 9, wherein each of the pre-condition and post-condition constraints are specified using an extension of a language based on a design-by-contract paradigm.

17. A computer system comprising:

a processor for executing software instructions;

a memory for storing said software instructions;

a system bus coupling said memory and said processor; and a storage device recording said software instructions that are loadable to said memory for implementing a method comprising:

recording, for a module, an interface specification that specifies pre-condition constraints on input values of methods of the module and post-condition constraints on output values of the methods of the module;

creating, based upon the recorded interface specification, a driver unit for the module that complies with the pre-condition constraints specified by the interface specification; and creating, based upon the recorded interface specification, a stub unit for the module that checks compliance with the specified pre-condition constraints and that complies with the specified post-condition constraints of the interface specification.

18. The computer system as claimed in claim 17, wherein said method further comprises incorporating, at an entry point of the stub unit, one or more statements that determine compliance with the specified pre-condition constraints.

19. The computer system as claimed in claim 18, wherein said method further comprises incorporating, at an exit point of the stub unit, a statement that returns a value that complies with the specified post-condition constraints.

20. The computer system as claimed in claim 17, wherein the interface specification records pre-condition constraints that specify constraints on the invocation order of the methods of the module.

21. The computer system as claimed in claim 20, wherein said method further comprises composing an integrated pre-condition constraint that incorporates each of the specified constraints on the invocation order of the methods of the module.

22. The computer system as claimed in claim 20, wherein said method further comprises generating all method invocation sequences that comply with the specified pre-condition constraints upon the invocation order of the methods of the module.

23. The computer system as claimed in claim 22, wherein said method further comprises calling the methods specified in each of the generated valid method invocation sequences with input parameters that comply with the specified pre-condition constraints on the input methods of the respective methods of the module.

24. The computer system as claimed in claim 17, wherein each of the pre-condition and post-condition constraints are specified using an extension of a language based on a design-by-contract paradigm.

* * * * *